No. 660,554. Patented Oct. 30, 1900.
A. F. BLESCH & E. PALMER.
SANITARY FLUSHING DEVICE.
(Application filed Mar. 9, 1900.)

(No Model.)

WITNESSES:
R. G. Hessong.
A. L. Phelps.

INVENTORS.
August F. Blesch.
Edward Palmer.
BY C. C. Shepherd
ATTORNEY

THE NORRIS PETERS CO., PHOTO-LITHO., WASHINGTON, D. C.

UNITED STATES PATENT OFFICE.

AUGUST F. BLESCH AND EDWARD PALMER, OF COLUMBUS, OHIO.

SANITARY FLUSHING DEVICE.

SPECIFICATION forming part of Letters Patent No. 660,554, dated October 30, 1900.

Application filed March 9, 1900. Serial No. 7,948. (No model.)

*To all whom it may concern:*

Be it known that we, AUGUST F. BLESCH and EDWARD PALMER, citizens of the United States, residing at Columbus, in the county of Franklin and State of Ohio, have invented a certain new and useful Improvement in Sanitary Flushing Devices, of which the following is a specification.

Our invention relates to the improvement of sanitary flushing devices; and the objects of our invention are to provide a simple, reliable, and effective mechanism whereby water may be accumulated within a supply-tank and discharged therefrom, as desired; to provide improved means whereby the opening of the discharge-valve may be accomplished by an upward pressure of the finger of the operator, and to produce other improvements in detail of construction and arrangement of parts, which will be more fully pointed out hereinafter. These objects we accomplish in the manner illustrated in the accompanying drawings, in which—

Figure 1:
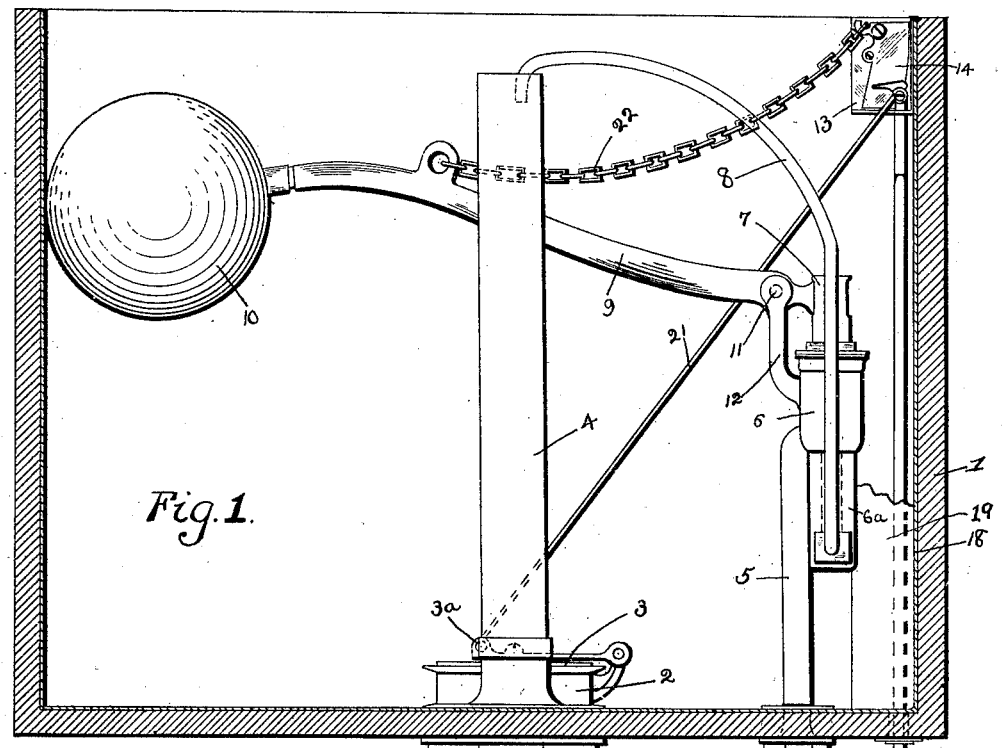
Figure 2:
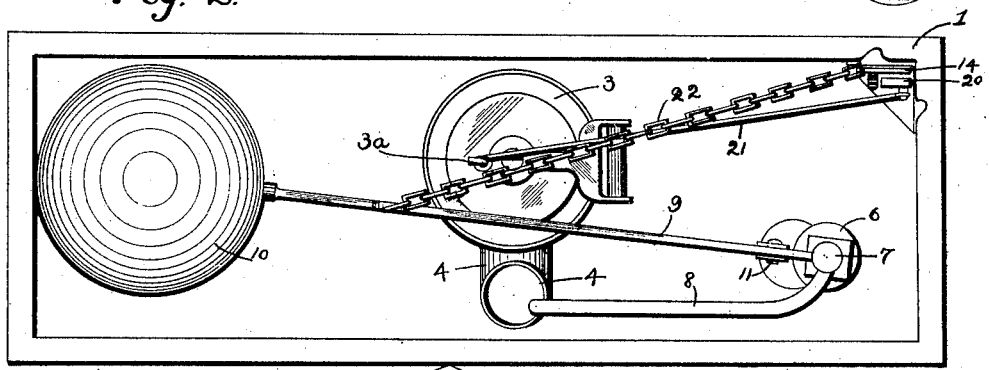
Figure 3:
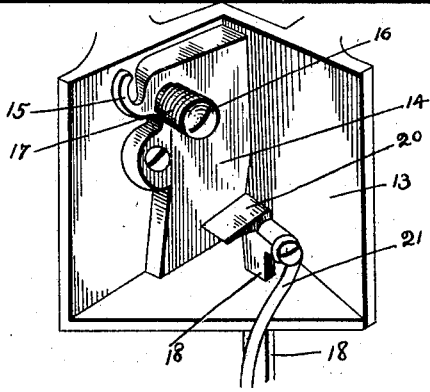

Figure 1 is a vertical section of a flushing-tank, showing our improved mechanism therein in elevation. Fig. 2 is a plan view of the same, and Fig. 3 is detail view in perspective of an operating-rod locking and releasing mechanism which we employ in the manner hereinafter described.

Similar numerals refer to similar parts throughout the several views.

1 represents a water-tank, which is preferably of the general oblong form shown, but which may be of suitable outline or dimensions.

2 represents a valve-chamber or water-outlet head, which is supported within the tank, at the bottom thereof, and which is provided with a downwardly-extending threaded neck $2^a$, the latter projecting below the bottom of said tank. The valve-chamber or outlet-head 2 is adapted to be closed in the usual manner by a hinged valve 3. Leading into one side of the head or chamber 2 is the lower horizontal termination of a vertical pipe 4, which extends to a point in the upper portion of the tank 1.

5 represents a water-inlet pipe which preferably leads through the bottom of the tank 1 near one end thereof, said pipe 5 having its upper end portion communicating with a vertical tubular valve-casing 6, the flow of water from said pipe 5 to said valve-casing being controlled by a vertically-movable valve-plug 7 in the usual manner. Leading out of a downward extension $6^a$ of the valve-casing 6 at a point above the lower discharging end of the latter is a comparatively small water-pipe 8, which extending upwardly has its upper termination in the upper end of the pipe 4. With the valve-plug 7 is connected an outwardly-extending float bar or arm 9, the latter carrying on its outer end a suitable float-ball 10. The bar 9, as indicated at 11, is fulcrumed to an arm 12, which extends upward from the valve-casing 6.

In the upper portion of the tank and in one corner thereof we provide an angular bracket or plate 13, and on that wing of said plate which is against the side wall of the tank we fulcrum a latch-plate 14, the latter being so fulcrumed and weighted as to cause its upper portion to naturally swing to the rear or against that wing of the bracket 13 which adjoins the end of the tank. In its upper and outer portion the latch-plate 14 is provided with a hook 15 and with a laterally-projecting pin 16, upon which are loosely mounted a desirable number of friction rings or washers 17.

Extending upward through the bottom of the tank, in one corner thereof, is a push rod or bar 18, the latter being inclosed within a corner-compartment formed by a diagonally-arranged partition 19. The upper end portion of this push-rod 18, which extends loosely through an opening in the bottom plate or floor of the angle-bracket 13, is provided, as shown more clearly in Fig. 3 of the drawings, with a slightly-inclined projecting catch-head 20, the latter being adapted when said bar is raised vertically to come into contact with the under side of the friction-rings 17, causing the upper portion of the latch-plate 14 to swing forwardly until said catch-head is above the same, at which time said latch-plate will swing to its normal position and said catch-head may engage the upper sides of said friction-rings, and thus be suspended in an elevated position. With a lateral extension of the catch-head 20 is connected the upper end of a valve-operating rod 21, the latter extending downwardly and having its lower end jointedly connected with a projecting lug 3ª of the valve 3.

22 represents a chain which connects the latch-plate-hook extension 15 with the float-bar 9, as shown.

In filling the tank 1 water rises through the supply-pipe 5 and passes into said tank through the valve-tube extension 6, the water thus supplied to said tank gradually raising the float-ball 10 to the position indicated in the drawings. When the float-ball is in such elevated position, it is obvious that the valve-plug 7 will be lowered within its casing or tube to cut off entrance of water from the pipe 5 in the usual manner. It will also be seen that the raising of the float 10 imparts such slack to the chain 22 as to admit of the latch-plate 14 dropping to its vertical or normal position, as shown. It being desired to flush a bowl or other receptacle with which the outlet 2ª is connected by suitable piping, the button termination of the bar 18 is pushed upward until its catch 20 engages, in the manner hereinbefore described, the washer or ring covered pin 16. Through this elevation of the bar 18, and the consequent elevation of the rod 21, the valve 3 is opened and the water contained in the tank allowed to rush outward through the valve-chamber 2 and its outlet extension 2ª. As the float and its arm 9 descend it is obvious that valve 7 will be raised to an open position, and the water entering through the pipe 5 will be again discharged into the tank through the valve-casing extension 6. The volume or force of water thus furnished by a city supply-pipe is sufficient to cause a stream of water to enter and move upward through the smaller pipe 8 and into the vertical tube 4. As the water is discharged through the valve-chamber 2 and the float is lowered it is obvious that a sufficient pull will be exerted on the chain 22 to cause the upper portion of the latch-plate to be drawn outward, thereby releasing the engagement of the catch-head 20 and the pin 16 and allowing the bar 18 and valve-rod 21 to drop downward, thus closing the valve 3. The flow of water through the pipe 8, however, which is caused in the manner hereinbefore described, continues during the filling of the tank, and the water thus discharged through the tube 4 and outlet 2ª serves to again fill the bowl or other receptacle to which said outlet 2ª leads. It is obvious that when the ball has again been sufficiently elevated by the incoming water and the valve 7 closed the latch-plate 14 will have dropped back to its normal position and the push-bar 18 will also have dropped into position for again being forced vertically.

It is obvious that a flushing-tank of the above description may be so located as to admit of the operator conveniently reaching the push-bar 18 with the hand, thus obviating the necessity of employing pulling-chains or other similar operating devices.

It will be observed that by providing the pin 16 with the friction rings or washers said rings may rotate when brought into contact with the catch-head 20, thus preventing a tendency of a binding or engagement of said head with the lower side of the pin 16 and reducing the friction which might otherwise be caused by the catch-head passing the pin.

The construction herein shown and described is exceedingly simple, and the parts thereof are so arranged as to insure a positive operation and prevent any tendency of the same toward getting out of order.

Having now fully described our invention, what we claim, and desire to secure by Letters Patent, is—

1. In a flushing-tank and mechanism therefor, the combination with a tank 1, a water-inlet pipe 5, a valve controlling said water-inlet and a fulcrumed float-carrying arm 9 connected with said valve, of a swinging latch-plate 14 having a laterally-projecting pin, a chain connection between said latch-plate and float-arm, a vertically-movable arm 18 having a catch-head adapted when elevated to engage the laterally-projecting pin of said latch-plate and a connection between said catch-head and the outlet-valve whereby the raising of the former opens the latter, substantially as specified.

2. In a flushing-tank and mechanism therefor, the combination with a tank-body 1, a valve-controlled outlet for said tank and a valve-controlled inlet therefor, of a vertically-movable bar 18, a connection between said bar and outlet-valve, said bar having a projecting head, a swinging latch-plate 14 in the upper portion of said tank having a laterally-projecting pin, friction-rings loosely mounted on said pin, the head of said push-bar adapted to contact with and engage the rings of said pin when said push-bar is elevated, substantially as specified.

AUGUST F. BLESCH.
EDWARD PALMER.

In presence of—
C. C. SHEPHERD,
A. L. PHELPS.